(12) United States Patent
Brüls et al.

(10) Patent No.: US 6,614,989 B1
(45) Date of Patent: Sep. 2, 2003

(54) RECORDING AND EDITING HDTV SIGNALS

(75) Inventors: Wilhelmus H. A. Brüls, Eindhoven (NL); Adrianus J. M. Denissen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/352,096

(22) Filed: Jul. 14, 1999

(30) Foreign Application Priority Data

Jul. 15, 1998 (EP) .......................... 98202372

(51) Int. Cl.[7] .................. H04N 5/917; H04N 7/26
(52) U.S. Cl. .................. 386/110; 386/122; 386/123; 386/131; 386/117
(58) Field of Search ................ 386/117, 123, 386/109, 111, 124, 112, 68, 131, 129, 122, 110; H04N 7/26, 5/917

(56) References Cited

U.S. PATENT DOCUMENTS

| | | | | |
|---|---|---|---|---|
| 5,317,413 A | * | 5/1994 | Yanagihara | 386/131 |
| 5,394,249 A | * | 2/1995 | Shimota et al. | 386/124 |
| 5,394,275 A | * | 2/1995 | Iketani et al. | 386/131 |
| 5,396,374 A | * | 3/1995 | Kubota et al. | 386/96 |
| 5,408,270 A | * | 4/1995 | Lim | 375/240.25 |
| 5,563,661 A | * | 10/1996 | Takahashi et al. | 386/117 |
| 5,646,692 A | | 7/1997 | Bruls | 348/438 |
| 5,673,358 A | * | 9/1997 | Boyce | 386/112 |
| 5,784,526 A | * | 7/1998 | Shimota et al. | 386/109 |
| 5,887,115 A | * | 3/1999 | Boyce et al. | 386/129 |
| 5,978,545 A | * | 11/1999 | Kato et al. | 386/112 |

* cited by examiner

Primary Examiner—Vincent Boccio
(74) Attorney, Agent, or Firm—Russell Gross

(57) ABSTRACT

A method is disclosed for compressing an HDTV signal (1) in such a manner that it can be recorded and edited with SDTV equipment (4,5). More particularly, the HDTV signal is recorded on digital recorders (e.g. DVCPRO) which have been designed for recording compressed SDTV signals. A sub-sampled version of the HDTV signal is recorded in first locations (20) of compressed macroblocks in a manner complying with the relevant SDTV recording format. The HDTV signal is compressed (2) and formatted (3) for being recorded in further locations (21). Between said first and further locations, an end-of-block code (28) is recorded so that the recorder (4) will ignore the HDTV data. Upon playback, a recognizable version of the sub-sampled HDTV signal is displayed on an SDTV receiver (5). Readily available SDTV equipment can thus be used for HDTV editing. In one embodiment of the invention, the sub-sampled HDTV signal consists of selected DC coefficients. The corresponding SDTV version is a full-screen but low-resolution image (FIG. 5B). In another embodiment, the HDTV signal is first sub-sampled in the pixel domain and separately encoded. The corresponding SDTV version is displayed at the normal SDTV resolution but has a reduced size (FIG. 7B).

7 Claims, 5 Drawing Sheets

RECORDING AND EDITING HDTV SIGNALS

FIELD OF THE INVENTION

The invention relates to a method of recording a high-definition television (HDTV) signal on a storage medium which is arranged for storage of a standard-definition television (SDTV) signal, the method comprising the steps of generating a sub-sampled version of the HDTV signal, recording said sub-sampled version of the HDTV signal in first locations of the storage medium which represent an SDTV image, compressing the HDTV signal to obtain a compressed HDTV signal, and recording the compressed HDTV signal in further locations of the storage medium.

The invention also relates to a method of transmitting an HDTV signal and to an apparatus for formatting an HDTV signal so as to allow recording thereof on SDTV recorders, and to a method and arrangement for playing back HDTV signals.

BACKGROUND OF THE INVENTION

A known method of recording HDTV signals on a conventional SDTV recorder is disclosed in Applicant's United States Patent U.S. Pat. No. 5,646,692. In this prior-art method, the HDTV signal is compressed in a manner which is well-known in the art. More particularly, each image is divided into blocks of 8*8 pixels, and the blocks are subjected to a Discrete Cosine Transform to obtain a DC coefficient and a plurality of AC coefficients for each block. The AC coefficients are quantized and variable-length coded, the quantization being controlled in such a way that the amount of data for each image corresponds to the amount of data of an uncompressed SDTV image. The data is then recorded on the SDTV recorder.

In one embodiment of the prior-art method, the SDTV recorder is of a type which stores uncompressed SDTV signals. In this embodiment, the DC coefficients of the HDTV signal (which represent the average luminance or chrominance of the blocks) are recorded as SDTV pixels. The DC coefficients are ordered in such a way that the corresponding SDTV pixels constitute a small but recognizable version of the HDTV picture. The rest of the compressed HDTV signal is recorded outside this SDTV sub-picture and becomes manifest as noise or snow when the recorded data is reproduced by an SDTV receiver. The recorder used in this embodiment is a professional machine and is relatively expensive.

In another embodiment of the prior-art method, which corresponds to the preamble of the appended claims, the SDTV recorder is of a type which stores compressed SDTV signals. In this embodiment, the DC coefficients of the HDTV signal are first arranged to constitute the SDTV sub-picture. This sub-picture is then applied to the recorder and stored, using the recorder's compression stage. The compressed HDTV signal bypasses the recorder's compression stage and is directly recorded on tape locations not used for storing the sub-picture.

The prior-art method allows HDTV material to be recorded on, and edited with, SDTV equipment.

OBJECT AND SUMMARY OF THE INVENTION

It is an object of the invention to further improve the above acknowledged prior-art method for recording HDTV signals.

To this end, the method in accordance with the invention is characterized in that the storage medium is of a type which comprises storage blocks for storing compressed SDTV image blocks, the method further comprising the steps of recording the sub-sampled version of the HDTV signal in first locations of selected storage blocks, recording an end-of-block code after said first locations, and recording the compressed HDTV signal in further locations of said storage blocks.

The invention is based on the desire to use cost-effective and readily available SDTV recorders for recording and editing MPEG2-coded HDTV material. Examples of such SDTV recorders are known in the art as DVCPRO or digital Betacam. They store compressed image SDTV blocks in respective storage blocks. With the invention, it is achieved that the sub-sampled version of the HDTV signal is recorded in only a part of said storage blocks. The end-of-block codes ensure that the data stored in further locations of the storage blocks is ignored when the recorded signal is reproduced by the SDTV recorder. The capacity for recording the HDTV signal is thus enlarged.

In one embodiment of the method, selected DC coefficients of the compressed HDTV signal are recorded in storage block locations which represent the DC coefficients of the SDTV signal. When the recorded signal is reproduced by SDTV equipment, the selected DC coefficients are displayed as image blocks having a uniform luminance and chrominance. They constitute a full-screen SDTV image, showing a checked but recognizable version of the HDTV image, which is sufficient for the purpose of editing. In this embodiment, the DC coefficients of all storage blocks collectively constitute the sub-sampled version of the HDTV signal.

In another embodiment the HDTV signal is first sub-sampled in the spatial domain to form an SDTV sub-picture. Said sub-picture is then separately encoded to obtain compressed image blocks complying with the format of, but having fewer bits than, the storage blocks of the storage medium. In this embodiment, the sub-sampled HDTV signal is reproduced as an SDTV sub-picture at normal resolution.

DESCRIPTION OF EMBODIMENTS

Figure 1:
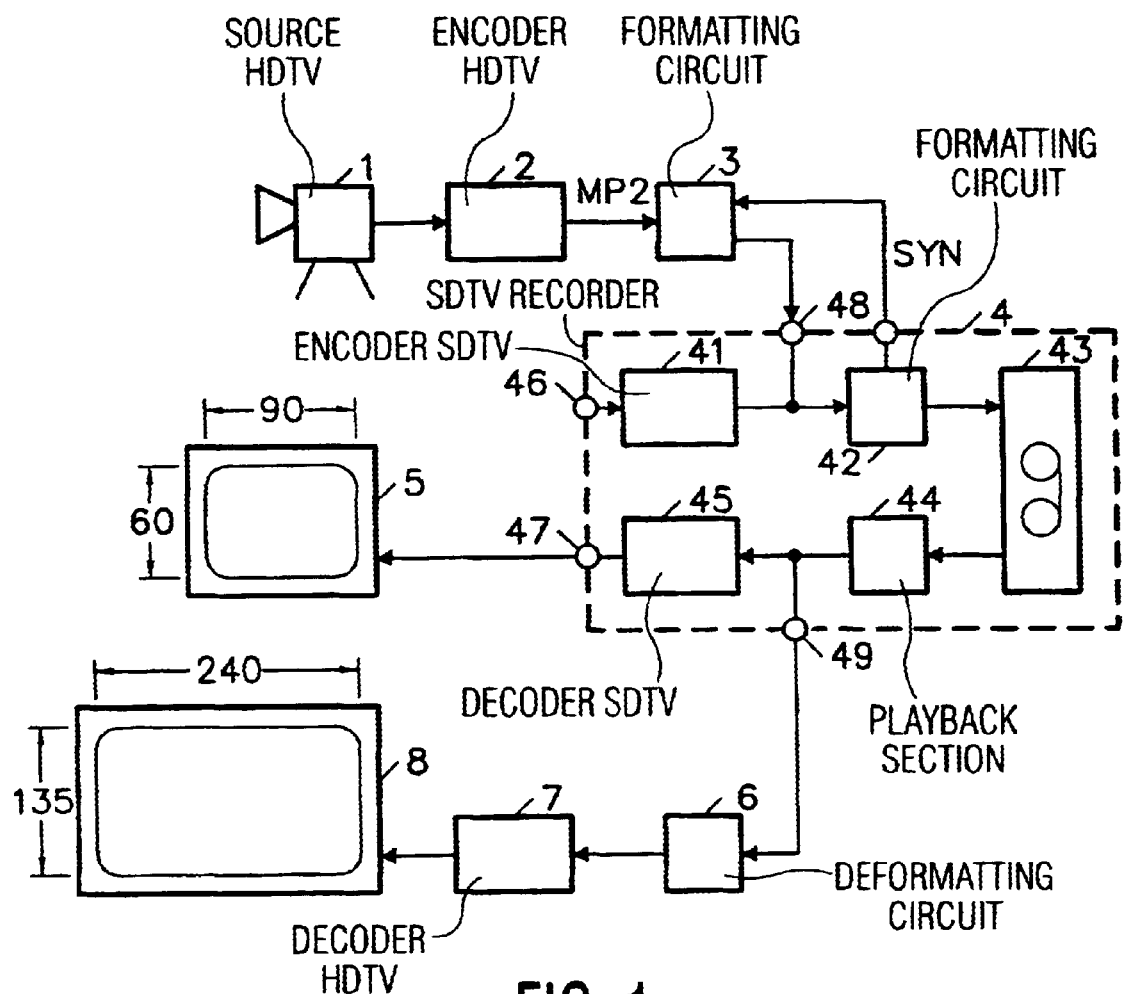
FIG. 1 shows schematically an embodiment of a system carrying out the method in accordance with the invention.

FIG. 1 shows a schematic diagram of one embodiment of a system for carrying out the method in accordance with the invention. The system comprises an HDTV signal source 1, an HDTV encoder 2, a formatting circuit 3, a digital SDTV recorder 4, an SDTV receiver 5, a deformatting circuit 6, an HDTV decoder 7, and an HDTV receiver 8.

Before explaining the system, the SDTV recorder 4 will be described first. As shown in FIG. 1, the recorder comprises an SDTV encoder 41, a recording section 42 including error protection means, a storage medium 43 in the form of a digital video tape, a playback section 44 including error correction means, and an SDTV decoder 45. The recorder has an SDTV signal input 46 which is not used in this system and therefore not connected, and an SDTV signal output 47 which is connected to the SDTV receiver 5. The recorder further has a data input terminal 48 which allows the SDTV encoder 41 to be bypassed and data to be recorded directly on the tape 43. A corresponding data output terminal is denoted 49 in the Figure. The recorder 4 is known per se. An example is the DVCPRO422 digital video recorder, in which "422" denotes the 4:2:2 video format. Although no video source is connected to the SDTV signal input 46, the manner of recording such a 4:2:2 video signal will now be described to an extent which is necessary for understanding the invention. The NTSC system will be assumed but the invention equally applies to other standards having different numbers of pixels such as PAL.

Figure 2:
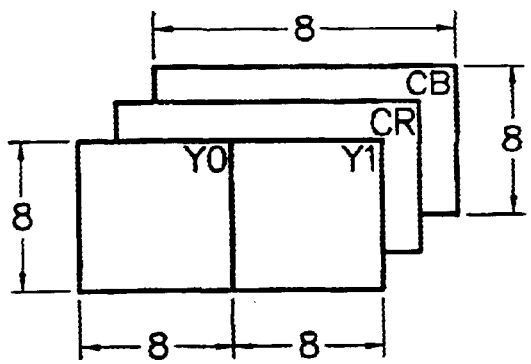
FIG. 2 shows a macroblock to illustrate the operation of the system which is shown in FIG. 1.

In the encoder 41, each NTSC image having 720 luminance (Y) pixels horizontally and 480 luminance pixels vertically is divided into image blocks of 8*8 pixels. The same applies to the chrominance signals CR and CB of which there are (in the 4:2:2 standard) 360 pixels horizontally and 480 pixels vertically. Thus, as illustrated in FIG. 2, there is a chrominance pixel block CR and a chrominance pixel block CB for every two luminance pixel blocks Y0 and Y1. The number of luminance blocks into which SDTV images are divided (90 horizontally and 60 vertically) is shown in FIG. 1 for reference. Each image block of 8*8 pixels is transformed into 64 spectral coefficients by a discrete cosine transform (DCT). One of these coefficients represents the average luminance or chrominance and is usually referred to as the DC coefficient. The other coefficients represent spatial details and are referred to as AC coefficients. The AC coefficients are quantized and variable-length coded.

The DC coefficients (12 bits) and the variable-length code words (a variable number of bits) collectively constitute a DCT block. Such a block ends with, and includes, an end-of-block code EOB. The four DCT blocks representing Y0, Y1, CR and CB constitute a macroblock.

Figure 3:
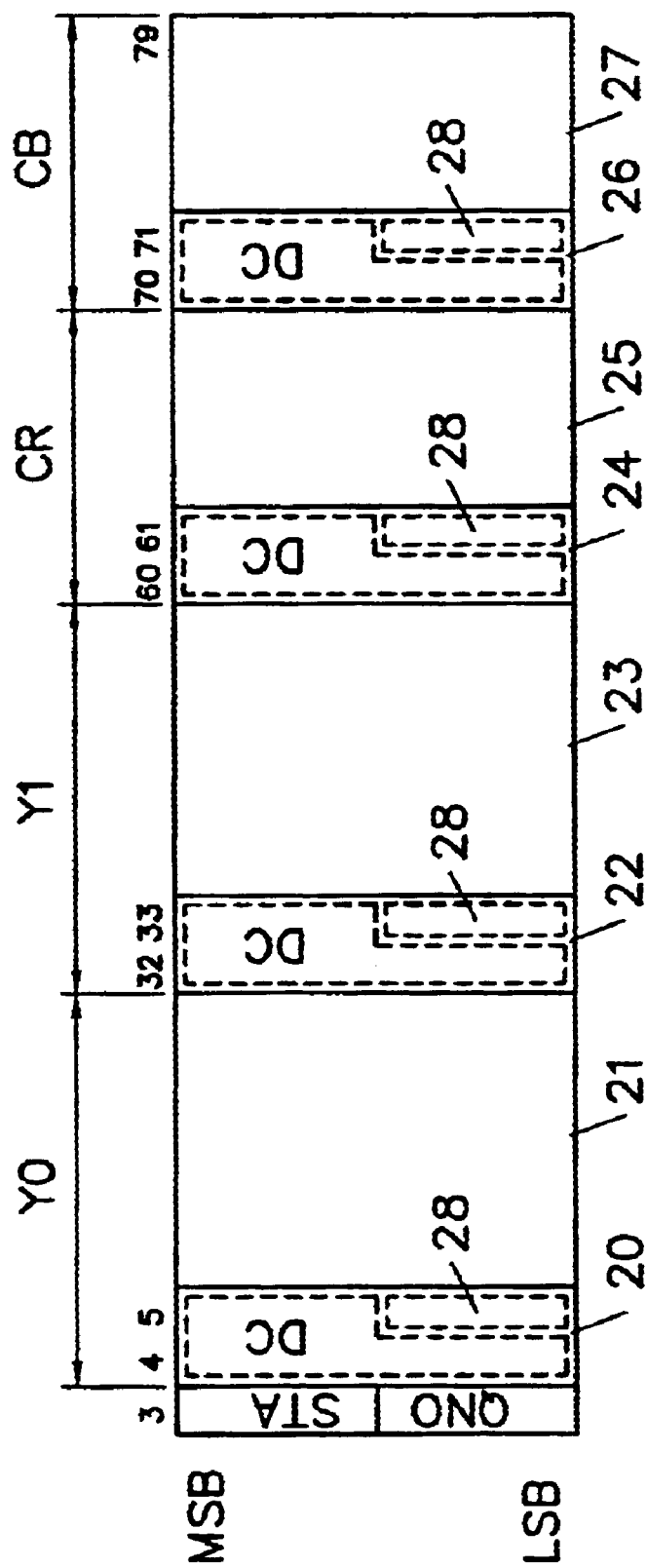
FIG. 3 shows a storage format to illustrate the operation of the system which is shown in FIG. 1.

Each macroblock of the encoded SDTV signal is recorded on a predetermined position of the tape 43. More particularly, each macroblock is recorded in a respective storage block. FIG. 3 shows the layout of a storage block of the DVCPRO422 storage medium. It comprises 80 bytes of which the first three bytes 0–2 (not shown) are synchronization bytes. Byte 3 comprises a nibble (4 bits) STA comprising status information, and a nibble QNO comprising, inter alia, information about the quantization step size used by the SDTV encoder 41. The DC coefficient of DCT luminance block Y0 (12 bits) is accommodated in a location 20 comprising bytes 4 and 5. In a similar manner, the DC coefficient of DCT luminance block Y1 is accommodated in a location 22 (bytes 32, 33), the DC coefficient of DCT chrominance block CR in a location 24 (bytes 60, 61), and the DC coefficient of DCT chrominance block CB in a location 26 (bytes 70, 71). The code words representing the AC coefficients are stored in further locations 21, 23, 25 and 27.

The method for recording HDTV signals on the SDTV recorder 4 will now be explained. The HDTV signal from video source 1 is applied to the HDTV encoder 2 which encodes and compresses the signal in a manner which is known per se. In practical systems, the HDTV signal is encoded in conformance with the relevant high-definition provisions of the MPEG2 standard. The basic principles of MPEG2 encoding are substantially the same as described above with reference to FIG. 2. That is, each sub-picture comprising two luminance blocks Y0, Y1 and two chrominance blocks CR, CB is compressed into four DCT blocks which constitute a macroblock. Note that there are significantly more luminance (and chrominance) blocks in an HDTV image than the 90*60=5400 luminance blocks in a conventional SDTV image. More precisely, an HDTV image may include 1920*1080 luminance pixels which corresponds to 240*135 blocks as shown in FIG. 1. In order to achieve a large compression ratio, MPEG2 does not autonomously encode each HDTV image individually (intraframe coding). Most pictures are differentially encoded (interframe coding) using motion compensation. Using this method, the HDTV encoder 2 compresses the HDTV signals into a compressed signal MP2 having a bit rate which substantially corresponds to the capacity of the DVCPRO422 storage medium (50 Mbit/sec).

The MPEG2 encoded HDTV signal may be directly applied to the recorder's data input terminal 48. Upon playback, the compressed signal is then taken from the data output terminal 49 and applied to the HDTV decoder 7 and displayed on the HDTV receiver 8. Needless to say that a signal thus recorded cannot be decoded by the recorder's own decoder 45 because it does not comply with the DVCPRO422 format.

In accordance with the invention, the compressed HDTV signal MP2 is applied to a formatting circuit 3 prior to being recorded. Upon playback, the recorded signal is applied to a deformatting circuit 6 which performs the inverse operation. In view thereof, a description of the formatting circuit 3 is sufficient for enabling a skilled person to put the invention into practice.

Figure 4A:
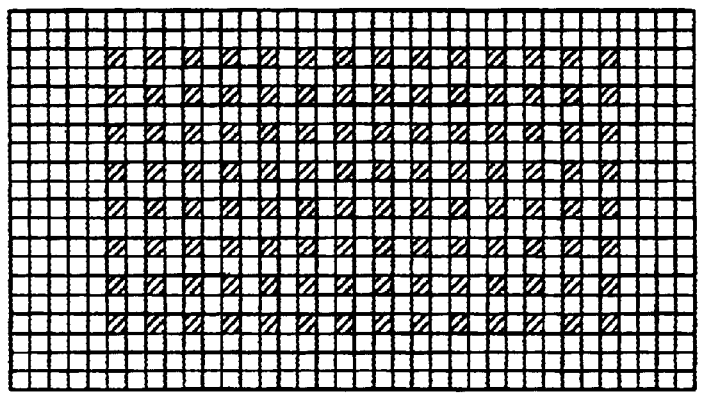
FIGS. 4A and 4B show a distribution of DC coefficients of images in blocks to illustrate the operation of the system which is shown in FIG. 1.

Generally speaking, the formatting circuit 3 scans the applied compressed HDTV signal MP2 for the occurrence of selected DC coefficients therein. More particularly, the circuit selects an evenly distributed subset of 90*60 luminance DC coefficients from the 240*135 DC coefficients of each image. One way to achieve this is to select every other DC coefficient (both horizontally and vertically) as has been attempted to show in FIG. 4A. The selected DC coefficients are removed from the compressed HDTV signal. The formatting circuit then inserts the selected coefficients, in the same order, at different positions of the data stream in such a way that they are recorded in the locations 20 and 22 (cf. FIG. 3) of successive storage blocks on tape. In the same manner, the corresponding subset of 45*60 chrominance DC coefficients is recorded in the locations 24 and 26, respectively. The formatting circuit further inserts an end-of-block code EOB 28 immediately after each selected DC coefficient. For DVCPRO media, the EOB is a 4-bit code (0110). Each DC section of a storage block (the locations 20, 22, 24 and 26 in FIG. 3) thus ends with this EOB code. In order to know where the DC coefficients and EOB codes are to be inserted, the formatting circuit 3 receives a synchronization signal SYN from the recorder 4. The rest of the compressed HDTV signal is recorded in the locations 21, 23, 25 and 27.

When the tape thus formatted is played back, the re-formatting circuit 6 puts the selected DC coefficients in their original positions and removes the EOB codes. The originally compressed HDTV signal is thus reconstructed, applied to the HDTV decoder 7, and displayed on the HDTV receiver 8.

Figure 4B:
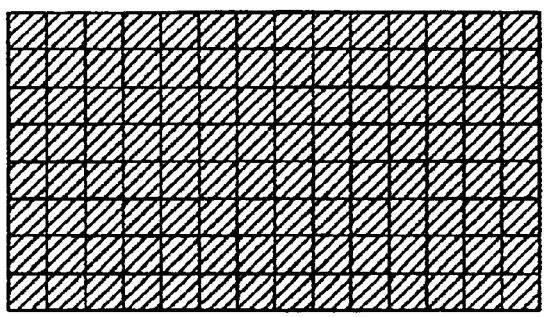

The significant advantage of the invention becomes manifest if it is considered how the recorded signal will be reproduced on the SDTV receiver 5. To that end, it is to be understood that each series of, successively, a DC coefficient, an EOB code and further data in a storage block is a data sequence which complies with the DVCPRO422 specification. Due to the EOB code, the further data of each sequence is ignored by the recorder's SDTV decoder 45. Accordingly, each of the 45*60 macroblocks will be inverse-transformed in two 8*8 pixel blocks having a uniform luminance and chrominance. The result thereof is that an SDTV picture of 90*60 blocks will be displayed on the receiver 5 as has been attempted to show in FIG. 4B. As each block corresponds to a selected block in FIG. 4A, the displayed SDTV image is a recognizable version of the HDTV image.

Figure 5A:
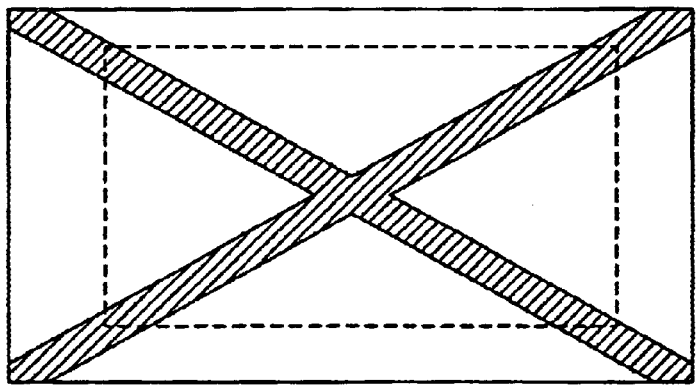
FIGS. 5A and 5B show examples of screen images to illustrate the operation of the system which is shown in FIG. 1.
Figure 5B:
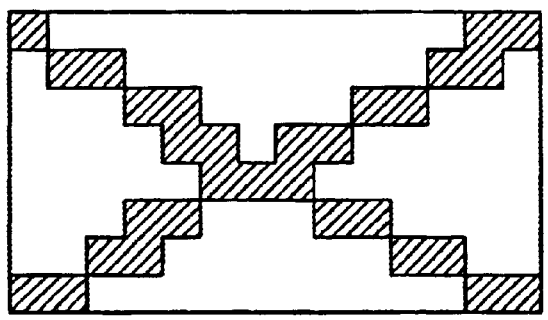

With the invention, it is thus achieved that HDTV signals can be recorded on SDTV recorders. Having recorded raw material in this manner, HDTV television programs can be edited, using only conventional SDTV equipment. Only when the program is eventually to be viewed in the high-definition format, more specific and expensive HDTV apparatuses need to be used again. For illustration, FIG. 5A shows an HDTV image and FIG. 5B shows the SDTV version thereof.

In the embodiment of the formatting circuit 3 described above, the position of selected DC coefficients in the compressed HDTV signal is merely changed. The compression factor is thus only reduced to such an extent that the EOB codes can be inserted. It may nevertheless be advantageous to leave the compressed HDTV signal unaffected and duplicate therein the DC coefficients representing the SDTV version of the signal. The DC coefficients can be copied from the compressed HDTV signal or calculated by a separate circuit. Such an embodiment has both advantages and disadvantages. A disadvantage is that the compression factor must be larger to make storage space available for inserting the duplicate DC coefficients. An advantage is that the duplicated DC coefficients merely need to be removed when the recorded signal is being applied to the HDTV decoder 8. This renders the re-formatting circuit 6 less complicated. A significant advantage of calculating the DC coefficients independently of the HDTV encoder 2 is that the DC coefficients of predictively encoded pictures (MPEG2's B- and P-pictures) are thereby obtained.

Figure 6:
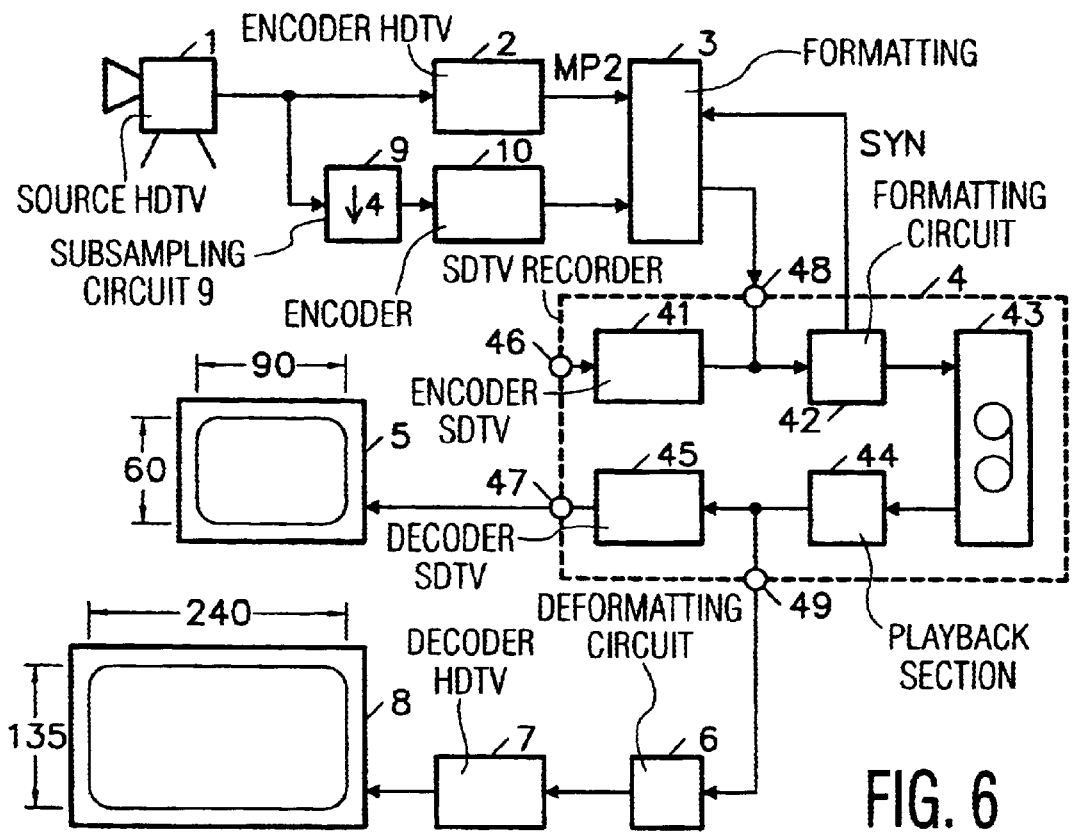
FIG. 6 shows schematically a further embodiment of a system carrying out the method in accordance with the invention.
Figure 7A:
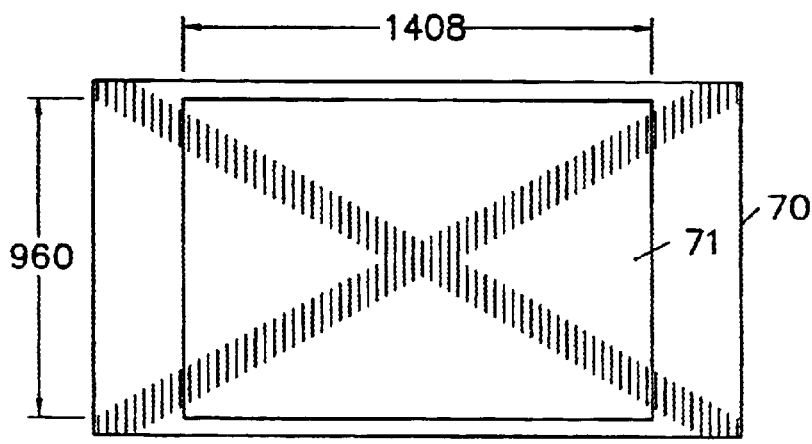
FIGS. 7A and 7B show examples of screen images to illustrate the operation of the system which is shown in FIG. 6.

FIG. 6 shows a schematic diagram of a further embodiment of a system for carrying out the method in accordance with the invention. The same reference numerals are used for the same circuit elements shown in FIG. 1. The systems differs from the one shown in FIG. 1 in that it comprises a sub-sampling circuit 9 and an additional encoder 10. As illustrated in FIG. 7A, the sub-sampling circuit 9 selects a window 71 having 1408*960 pixels from the HDTV image 70 of 1920*1080 pixels. The sub-sampling circuit 9 further sub-samples the window image by a factor of 4 to obtain a sub-sampled image of 352*240 pixels. The additional encoder 10 is an SDTV encoder of the same type as encoder 41 of recorder 4. That is, the sub-sampled image is divided into 8*8 pixel blocks and subjected to compression to obtain compressed image blocks complying with the DVCPRO422 format. However, as will be explained hereinafter, the additional encoder 10 differs from the recorder's encoder 41 in that the amount of data produced for the sub-picture is substantially lower.

Figure 7B:
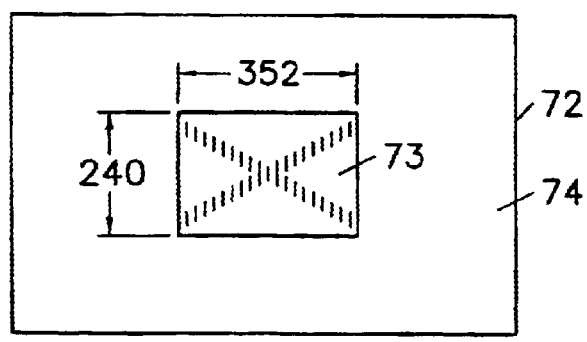

The formatting circuit 3 receives the synchronization signal SYN which is applied by recorder 4 and defines the position of an SDTV sub-picture having 352*240 pixels. FIG. 7B shows this SDTV sub-picture 73 in relation to the full-screen SDTV image 72 having 720*480 pixels. In response, the formatting circuit inserts the image blocks encoded by the encoder 10 in the MPEG2-encoded HDTV signal MP2, and records the sub-sampled image in those 22*30 storage blocks which represent the sub-picture 73. The sub-sampled HDTV image is decoded by the conventional decoder 45 of the recorder 4, and the corresponding sub-picture is reproduced by the SDTV receiver 5 upon playback.

Figure 8A:
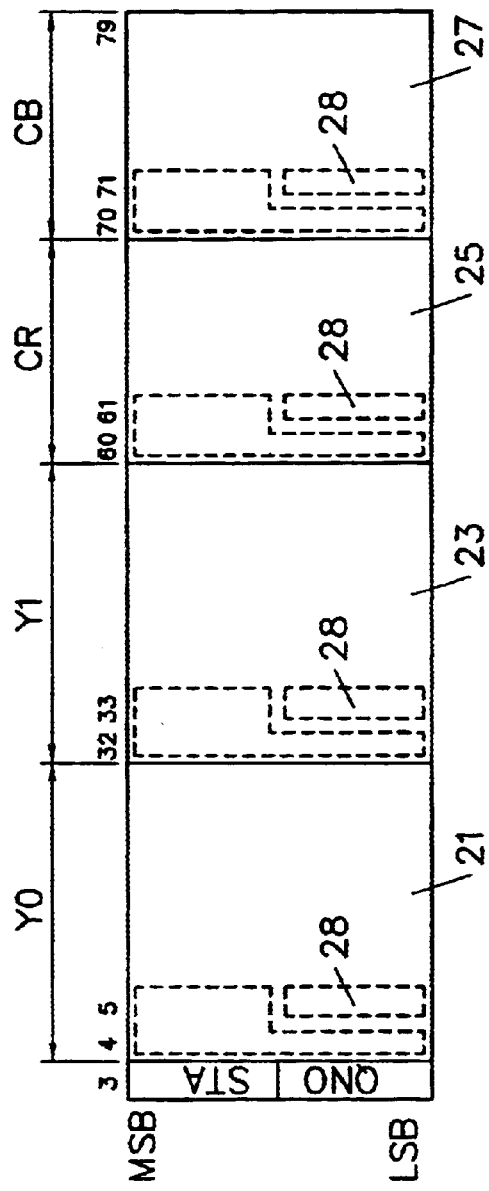
FIGS. 8A and 8B show a storage format to illustrate the operation of the system which is shown in FIG. 6.

The majority of HDTV data is recorded in the storage blocks which correspond to the image area outside the sub-picture, i.e. the image area 74 in FIG. 7B. Because this type of data does not comply with the DVCPRO format, the recorder's decoder 45 will produce a random signal in this area, which becomes manifest as snow or noise. This can be avoided by recording an end-of-block code EOB 28 in first occurring locations of these storage blocks qualified for storing such an end-of-block code. Such a first occurring location may be the very first location of a storage block or, as shown in FIG. 8A, the first location after the position which is interpreted by the DVCPRO to constitute a DC coefficient.

Figure 8B:
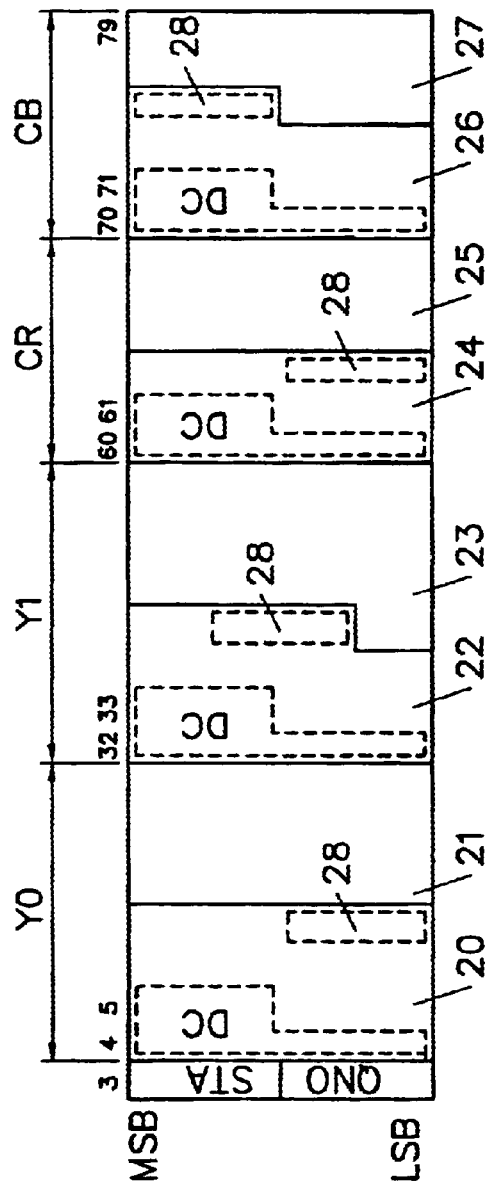

In order to create additional space for recording the HDTV signal, the additional encoder 10 differs from the recorder's encoder 41 in that the amount of data produced for the sub-picture is substantially lower than the capacity of the corresponding storage blocks. The sub-picture is then recorded in first locations, thereby leaving space for recording the HDTV signal in further locations. FIG. 8B shows an example of data recorded in a sub-picture storage block. The DC coefficient and further code words representing the sub-picture are stored in first locations 20, 22, 24, 26. HDTV data is stored in further locations 21, 23, 25, 27. The boundaries between first and further locations are respective end-of-block codes 28.

In a practical embodiment, the additional encoder 10 is arranged to produce N bytes (for example, N=16) per macroblock. The N bytes may be adaptively distributed among the DCT blocks Y0, Y1, CR and CB, depending on, inter alia, the amount of picture details in the sub-picture image blocks. FIG. 8B shows an example thereof. The number N may also be fixed for each DCT block, for example $N_{Y0}=5$, $N_{Y1}=5$, $N_{CR}=3$, $N_{CB}=3$.

By encoding the SDTV sub-picture in 16 instead of 76 bytes per macroblock, the sub-picture suffers from having a lower quality than a similar SDTV picture which is applied to the recorder's own SDTV input 46. However, as can be recalled from the foregoing, the purpose of this invention is to reproduce a recognizable version of the HDTV signal on the SDTV receiver 5.

In summary, a method is disclosed for compressing an HDTV signal (1) in such a manner that it can be recorded and edited with SDTV equipment (4,5). More particularly, the HDTV signal is recorded on digital recorders (e.g. DVCPRO) which have been designed for recording compressed SDTV signals. A sub-sampled version of the HDTV signal is recorded in first locations (20) of compressed macroblocks in a manner complying with the relevant SDTV recording format. The HDTV signal is compressed (2) and formatted (3) for being recorded in further locations (21). Between said first and further locations, an end-of-block code (28) is recorded so that the recorder (4) will ignore the HDTV data. Upon playback, a recognizable version of the sub-sampled HDTV signal is displayed on an SDTV receiver (5). Readily available SDTV equipment can thus be used for HDTV editing.

In one embodiment of the invention, the sub-sampled HDTV signal consists of selected DC coefficients. The corresponding SDTV version is a full-screen but low-resolution image (FIG. 5B). In another embodiment, the HDTV signal is first sub-sampled in the pixel domain and separately encoded. The corresponding SDTV version is displayed at the normal SDTV resolution but has a reduced size (FIG. 7B).

What is claimed is:

1. A method of recording a high-definition television (HDTV) signal on a storage medium which is arranged for storage of a standard-definition television (SDTV) signal, the method comprising the steps of:

generating a sub-sampled version of the HDTV signal;

recording said sub-sampled version of the HDTV signal in first locations of the storage medium which represent an SDTV image;

compressing the HDTV signal to obtain a compressed HDTV signal; and recording the compressed HDTV signal in further locations of the storage medium;

characterized in that the storage medium is of a type which comprises storage blocks for storing compressed SDTV image blocks; the method further comprising the steps of:

recording the sub-sampled version of the HDTV signal in first locations of selected storage blocks;

recording an end-of-block code after said first locations; and recording the compressed HDTV signal in further locations of said storage blocks.

2. The method as claimed in claim 1, wherein the steps of generating and recording the sub-sampled version of the HDTV signal include generating of DC coefficients representing an average luminance or chrominance of HDTV image blocks, and recording said DC coefficients in storage block locations for storing DC coefficients representing an average luminance or chrominance of SDTV image blocks.

3. The method as claimed in claim 1, wherein the steps of generating and recording the sub-sampled version of the HDTV signal include sub-sampling of the HDTV signal to obtain an SDTV sub-picture, encoding said SDTV sub-picture to obtain compressed image blocks complying with the format of, but having fewer bits than, the storage blocks of the storage medium, and recording said compressed image blocks in the first locations of storage blocks representing said SDTV sub-picture.

4. The method as claimed in claim 3, further comprising the step of recording an end-of-block code in first occurring locations of storage blocks not representing said SDTV sub-picture qualified for storing such an end-of-block code.

5. A method of formatting a compressed high-definition television (HDTV) signal into a channel bitstream which is arranged for accommodating a standard-definition television (SDTV) signal, the method comprising the steps of:

generating a sub-sampled version of the HDTV signal;

accommodating said sub-sampled version of the HDTV signal in first locations of the channel bitstream which represent an SDTV image; and accommodating the compressed HDTV signal in further locations of the channel bitstream;

characterized in that the channel bitstream is of a type which comprises channel blocks for accommodating compressed image blocks of the SDTV signal; the method further comprising the steps of:

accommodating the sub-sampled version of the HDTV signal in first locations of selected channel blocks;

accommodating an end-of-block code after said first locations; and accommodating the compressed HDTV signal at least in further locations of said selected channel blocks.

6. A device for formatting a compressed high-definition television (HDTV) signal into a channel bitstream suitable for recording as a standard-definition television (SDTV) signal, comprising means for:

generating a sub-sampled version of the HDTV signal;

accommodating said sub-sampled version of the HDTV signal in first locations of the channel bitstream which represent an SDTV image; and accommodating the compressed HDTV signal in further locations of the channel bitstream;

characterized in that the channel bitstream is of a type which comprises channel blocks for accommodating compressed image blocks of the SDTV signal; the device further comprising means for:

accommodating the sub-sampled version of the HDTV signal in first locations of selected channel blocks;

accommodating an end-of-block code after said first locations; and accommodating the compressed HDTV signal at least in further locations of said selected channel blocks.

7. A compressed high-definition television (HDTV) signal formatted into a bitstream representing a compressed standard-definition television (SDTV) signal, a sub-sampled version of the HDTV signal being accommodated in first locations of the bitstream which represent an SDTV image, and the compressed HDTV signal being accommodated in further locations of the bitstream;

characterized in that the bitstream comprises channel blocks for accommodating compressed SDTV image blocks, the sub-sampled version of the HDTV signal being accommodated in first locations of said storage blocks followed by an end-of-block code, and the compressed HDTV signal being accommodated in further locations of said channel blocks.

* * * * *